United States Patent [19]

Valia et al.

[11] 3,941,908

[45] Mar. 2, 1976

[54] STRAND MATERIAL COVERED WITH CLEAR FLAME RETARDANT COMPOSITION AND METHODS OF MAKING

[75] Inventors: Maheshkumar Parmananddas Valia, Hightstown, N.J.; William Charles Vesperman, Baltimore, Md.

[73] Assignee: Western Electric Company, Inc., New York, N.Y.

[22] Filed: June 18, 1974

[21] Appl. No.: 480,333

Related U.S. Application Data

[62] Division of Ser. No. 339,461, March 8, 1973, abandoned.

[52] U.S. Cl. ........ 428/379; 260/30.4 R; 260/30.6 R; 260/31.6; 260/31.8 G; 427/120; 428/921
[51] Int. Cl.² ... B05D 5/12; C08K 5/15; C08K 5/49; C08K 5/10
[58] Field of Search ................. 117/136, 232, 128.4; 260/31.6, 31.8 M, 31.8 R, 30.4 R, 30.6 R, 31.8 G; 427/120; 428/379, 921

[56] References Cited
UNITED STATES PATENTS

| | | | |
|---|---|---|---|
| 2,555,062 | 5/1951 | Small et al. | 260/31.6 |
| 3,149,087 | 9/1964 | Anagnostopoulos et al. | 260/31.6 |
| 3,274,135 | 9/1966 | Norman et al. | 260/31.8 R |
| 3,313,760 | 4/1967 | Barnes et al. | 117/232 X |
| 3,558,537 | 1/1971 | Hecker et al. | 260/31.8 R |

*Primary Examiner*—Michael R. Lusignan
*Attorney, Agent, or Firm*—E. W. Somers

[57] ABSTRACT

A retractile cord of a telephone handset having individually insulated conductors is jacketed with an extrudable flexible clear flame retardant composition which includes a polyvinyl chloride resin (PVC). A phthalate plasticizer is included to impart low temperature properties to the composition while a phosphate plasticizer is used for flame retardancy and a polymeric plasticizer for resistance to extraction of constituents of the composition by oils encountered during use. The composition also includes a metallic stabilizer, a lubricant, an ultraviolet light absorber, an epoxy resin and epoxidized plasticizing stabilizer. The extruded composition is characterized by excellent clarity as well as superior low temperature, flame-retardant and lacquer-mar properties. Equally important is the outstanding resiliency of strand material covered with the composition and wound into a helical configuration with a plurality of convolutions.

16 Claims, No Drawings

STRAND MATERIAL COVERED WITH CLEAR FLAME RETARDANT COMPOSITION AND METHODS OF MAKING

This is a division, of application Ser. No. 339,461 filed Mar. 8, 1973, now abandoned.

BACKGROUND OF THE INVENTION

1. Field of the Invention

This invention relates to strand material covered with a clear flame retardant composition and methods of making same and, more particularly, to telephone cordage jacketed with an extrudable clear flame retardant polyvinyl chloride composition having retractile properties and having protection against degradation by ultraviolet or diffused light while providing stability during manufacture as well as during customer use and methods of making.

2. Description of the Prior Art

Most telephone users are familiar with what is referred to in the art as the spring cord which extends a telephone circuit from a telephone base to a companion telephone handset. It has been the custom to match the color of the line cord, which connects a wall terminal with the telephone base, to the color of the housing of the base, the handset and the retractile cord. Due to the large number of colors and the several different lengths of cords that are available, installers must maintain an uneconomically large inventory of line and spring cords on service vehicles in order to provide the many combinations of length and color. This results in excessive inventory holding costs and requires additional warehouse and truck storage space.

To reduce the excessive costs involved, studies were made to ascertain if a single color cord, which would significantly reduce the number of combinations, could be used. It was decided that this universal color must be neutral in any environment, compliment the telephone set, be aesthetically appealing and be widely accepted by telephone subscribers. Tests showed that a line cord having tinned tinsel conductors individually insulated with a clear nylon material and jacketed with a clear polyvinyl chloride jacket had aesthetic appeal as indicated by a high acceptance rating in product test areas.

Clear flame retardant polyvinyl chloride compositions possessing characteristics required for telephone line cord jackets, have not been commercially available in the past. To obtain flame retardant characteristics, the prior art approach has been to employ additives such as antimony trioxide. This is sufficient if one is working with opaque formulations but the addition of additives such as antimony trioxide to clear polyvinyl chloride compositions is destructive of clarity.

The development of a composition is complicated further by additional demands because of the innumerable environments in which telephones are installed. For example, the final jacketing composition must be flexible and have superior low temperature flexibility properties so that the jacket will not be embrittled in some of the expected environments of use, such as in office buildings prior to placing the heating system in service. Also, the composition must remain clear during the exposure of the cord to ultraviolet radiation in sunlit rooms which tends to degrade the color of plastic covered cords.

In addition, the clear flame retardant jacketing composition must also be of such a nature as to not mar or damage any lacquered surface such as a desk or table top. Also, if the plastic jacket in contact with such a surface does not possess adequate mar resistance, the jacket surface will be permanently damaged.

A clear flame retardant composition for line cords and methods of jacketing line cords therewith is disclosed in copending application Ser. No. 258,964, filed June 2, 1972 in the names of E. S. Sauer and W. C. Vesperman.

While a line cord meeting the requirements set forth hereinbefore is available, the cord connecting the handset to the base presents an added requirement. The composition used to provide a jacket for spring cords must be such that the cord manufactured by jacketing, coiling, heat setting and removal-reversing operations (see U.S. Pat. No. 2,920,348, for example) results in a cord having retractile properties.

When the telephone is not in use, a retractile or spring cord takes the form of a tightly-wound helix. When the handset is removed from the base, the helix expands in a manner of a coil spring to permit the user to range a distance therefrom.

The construction of the spring cord as described in U.S. Pat. No. 3,037,068 issued on May 29, 1962 in the name of H. L. Wessel is designed to permit the repetitive flexure of the cordage for a relatively large number of times as encountered during normal usage. The spring cords must have sufficient retractility to insure that they will return promptly to their normal retracted form after having been extended and released.

Of course, such cords must not be so strongly retractile that they require an excessive amount of force to extend them. If a spring cord is too unyielding, instead of the cord extending when a pull is executed thereon, the instrument to which it is attached may be moved or pulled off its support. Further, it is economically desirable to obtain a desired extended length with as short a length of cordage as possible. Also, from an appearance standpoint, it is desirable that the retracted length of the spring cord be as short as possible.

The helical shape and the springiness of the cord are derived in part from the characteristics of the composition of the jacket surrounding the cord. This adds yet another requirement for the composition of the cord jacket. The composition must endow the cord with retractile properties as well as clarity, and low temperature properties.

Moreover, the composition must be such that the finished cord jacketed with that composition retains its retractile properties. Skin oils, for example, tend to cause plasticizers to migrate from a PVC composition. The composition should be resistant chemically to oils to prevent such migration and thereby preserve the retractility of the cord. This will also avoid the exuding of substances which may be dermatologically adverse to subscribers.

SUMMARY OF THE INVENTION

The present invention contemplates a strand material provided with an insulative covering having excellent retractile properties. The covering includes a polymeric material consisting essentially of at least 80 percent by weight of polyvinyl chloride, a monomenic plasticizer for imparting low temperature properties to the composition, a flame retardant plasticizer for flame retardancy, a polymeric plasticizer for establishing resistance to oil extraction, a metallic stabilizer, a lubricant, an ultraviolet light absorber, and an epoxy resin.

The strand material covered with the defined insulative covering may be wound in a helical configuration with a plurality of convolutions and further processed to produce a telephone cord having excellent retractile properties.

More particularly, strand material to be used in manufacturing telephone spring cords is covered with a clear flame retardant composition. Successive sections of the strand material are advanced and covered with a composition which comprises a polymeric material consisting essentially of at least 80 percent by weight of polyvinyl chloride, 10 to 40 parts by weight of a phthalate plasticizer, per 100 parts by weight of the polymeric material, 15 to 40 parts by weight of a phosphate plasticizer, per 100 parts by weight of the polymeric material, 15 to 45 parts by weight of a polymeric plasticizer, per 100 parts by weight of the polymeric material, 1 to 5 parts by weight of a metallic stabilizer system, per 100 parts by weight of the polymeric material, 0.25 to 1 part by weight of a lubricant, per 100 parts by weight of the polymeric material, 0.25 to 1.0 part by weight per 100 parts by weight of an ultraviolet light absorber, of the polymeric material, 1 to 4 parts by weight of an epoxy resin per 100 parts by weight of the polymeric material, and not exceeding 8 parts by weight of an epoxy plasticizing stabilizer, per 100 parts by weight of the polymeric material.

DETAILED DESCRIPTION

In the presently used environment of the composition embodying the principles of this invention, a telephone cord having tinned tinsel conductors insulated with nylon is jacketed with the inventive comprising a polyvinyl chloride (hereinafter referred to as PVC) constituent. The material of which the conductor is constructed is not critical. Commonly used conductors are copper and aluminum as well as alloys of either of these materials. Moreover, it is common practice to tin conductors to aid in making solder joints and no complications are introduced by this conventional procedure.

The nylon insulation or other suitable insulation over the tinned tinsel conductors is transparent as is the PVC jacket. However, it is not necessary that the nylon insulation possess the flame retardant properties characteristic of the PVC jacketing composition of the present invention.

The basic polymer which is utilized in the inventive composition is a polyvinyl chloride (PVC) resin, a homopolymer. The PVC resin has all of the characteristics associated with a homopolymer which includes some abrasion resistance, but which in and of itself is heat unstable. However, when the PVC resin is caused to soften during processing which is necessary to process the compound, the resistance to abrasion is reduced. Further, the PVC must be a suitable electrical grade PVC homopolymer.

Commercial PVC polymers which may contain up to 20 percent or preferably to a maximum of 10 percent by weight of comonomers or other admixed material such as propylene may be used without significant adverse effect. For example, PVC acetate or PVC propylene may also be used.

The PVC resin may be any of a number of PVC resins well known in the art for use as electrical insulation. In accordance with the A.S.T.M. standard for 1966, suitable compounds may be classified as within the range of from GP$\overline{4}$-00005 to GR$\underline{7}$-00005 inclusive. Definition of these characteristics are set forth in the A.S.T.M. standard under designation DI755-66.

Briefly, the designation, GP, designates a general purpose resin. The first numerals (entries 4 through 7) represent a polymer molecular weight in terms of solution viscosity and the last digit, 5, indicates the usual preference for an electrical conductivity less than 18 ohms per centimeter per gram. This electrical characteristic is, of course, not a basic requirement from the standpoint of the inventive teaching. The bar under or the bar over a numeral indicates a value less than or more than, respectively, the numeral. The four ciphers in the designations indicate that the properties of particle size, apparent bulk density, plasticizer absorption and dry flow may be any A.S.T.M. designated level, i.e., 1–9, and, therefore, these properties are not critical for the inventive purposes.

It is convenient to discuss concentrations in terms of parts by weight based on 100 parts of the polymeric material. The term polymeric material is defined as the PVC or the total admixed PVC. Concentrations so designated, therefore, result in compositions having greater than 100 parts.

Combined with the polyvinyl chloride resin to facilitate processing, including the extrusion, of the composition is a monomeric plasticizer, such as a phthalate plasticizer. The selected monomeric plasticizer must be an acceptable low temperature plasticizer. An acceptable low temperature plasticizer is one which combines with the polyvinyl chloride resin so as to become inserted between the molecules of the resin. In this way, at low temperatures of say 0° F and below, the low temperature plasticizer acts as bearings or rollers between the PVC resin molecules to maintain the material in a flexible condition.

Another problem arises in attempting to optimize the monomeric plasticizer. Plasticizers are members of the ester family which includes straight chain esters and branch chain esters. The straight chain ester materials are more effective in maintaining flexibility at low temperatures than branch chain materials, i.e., esters having say at least 35% branch chains. But branch chain esters have some advantages over straight chain esters, e.g., better so-called lacquer-mar characteristics, which relates to the effect of the composition on furniture with which the cord is in contact.

There are many commercially available monomeric plasticizers, but depending on the choice, the low temperature flexibility and lacquer-mar and oil resistance may vary. The choice of a monomeric plasticizer must be made as a function of the requirements of the overall composition. One of these, of course, is that the composition have excellent retractile properties.

Inappropriate plasticizing constituents within the composition tend to exude from the spring cord onto the lacquered surface of table tops on which the telephone handset may be supported. This extractive process causes a white streak to appear on the portion of the table top which had been in engagement with the cord.

A preferred concentration added to the polyvinyl chloride resin is 10–40 parts by weight of the phthalate plasticizer to 100 parts by weight of the polymeric material. If less than 10 parts are employed, additional phosphate plasticizer, which has lubricating properties inferior to the phthalate plasticizer, would be required. Also, the composition would have poorer low temperature flexing properties and poorer long term heat stability. If more than 40 parts are employed, the flame retardancy of the composition begins to decrease and the lacquer-mar resistance of the composition is reduced.

The phthalate plasticizer employed in a composition embodying the principles of the present invention may be a di(N-octyl-n-decyl) phthalate (designated 810P), a di (N-hexyl-n-decyl) phthalate (designated 610P), a di-2-ethylhexyl phthalate (designated DOP), a di-isodecyl phthalate (designated DIDP), a di-iso-octyl phthalate (designated D10P), a di-isononyl phthalate (designated D1NP), a ditridecyl phthalate (designated DTDP), a isodecyl-tridecyl phthalate (designated IDTP) or a di-undecyl phthalate (DUP).

It has been found that DUP, as marketed by the Monsanto Chemical Company and having a molecular weight of 474 is a suitable phthalate plasticizer.

The addition of DUP to a polymeric composition to produce a successful cord product is believed to be a surprising result. Usually, DUP is not used because of its permanence characteristics which causes it to flow out of the composition. Generally, if this large an amount of DUP is used to achieve desirable low temperature properties, the cord will feel moist to the touch. Apparently, the use of DUP together with a suitable flame retardant plasticizer stablizes the DUP within the matrix of the composition. The DUP is believed to be made more soluble in the composition because of the flame retardant plasticizer.

A triaryl phosphate plasticizer is used in order to render flame retardant the inventive composition. To be rated self-extinguishing, the composition must not support combustion under normal atmospheric conditions. In terms of A.S.T.M. under designation D2863, the subject composition should meet a minimum limiting oxygen index (L.O.I.). The oxygen index is defined as the volume percent of oxygen in a mixture of oxygen and nitragen required to support combustion. The greater the limiting oxygen index, the better are the flame retardant properties of the composition.

Of course, as in the planning of every product, it is necessary to weigh the costs involved. Care must be taken to optimize flame retardancy, but at the same time consideration must be given the costs so as not to unduly burden the customer. It is a requirement of retractile cords manufactured in accordance with certain requirements deemed necessary for subscriber installation that a minimum limiting oxygen index of 23 be achieved. Needless to say, the phosphate plasticizer is an essential part of the inventive composition in that the phosphate plasticizer is the constituent which is of assistance in achieving the minimum limiting oxygen index of 23.

The addition of the triaryl phosphate into the composition also affects advantageously the composition in other ways. For example, the phosphate plasticizer has a secondary effect of rendering the polyvinyl chloride composition processable in a manufacturing line. In addition, the phosphate plasticizer is of assistance in adding to the light stability of the composition.

A preferred concentration of the triaryl phosphate added to the PVC is 15–40 parts by weight of the phosphate plasticizer to 100 parts by weight of the polymeric material.

A delicate balancing of the number of parts by weight of the triaryl phosphate in relation to the other constituents of the composition is necessary. If less than 15 parts are employed, the limiting oxygen index requirement is not met. On the other hand, the greater the number of parts by weight of the phosphate plasticizer, the higher the limiting oxygen index. However, although the phosphate is of assistance in achieving flame retardancy, the material adds greatly to the overall expense of the composition. For example, commercially available phosphates may cost in the range of two to three times the cost of monomeric plasticizers. Also, the use of more than 40 parts decreases the lacquer-mar resistance, the heat stability, the low temperature properties, and the processability of the composition.

The phosphate plasticizer may be a triaryl phosphate such as Kronitex K-100 as marketed by FMC Chemical Co. The Kronitex K-100 has a molecular weight of 340, an acidity in percent of 0.2 meg/100 grams maximum and a boiling point of 390° C at a pressure of 760 mm of mercury. Other phosphates which may be used include an octyl diphenyl phosphate (ODP), an isodecyl diphenyl phosphate or a halogenated mixed triaryl ester such as Phosflex 300 marketed by The Stauffer Chemical Co.

The composition must be sufficiently oil resistant so as to preclude the exudation of the jacket constituents of the jacket material when in contact with the customer's hands. In order to accomplish this, a polymeric plasticizer is combined with the PVC and the monomeric and phosphate plasticizers. The aforementioned constituent renders the composition resistant to oils extracting plasticizers from the composition. If the cord did not meet this requirement, the customer could experience dermatological problems. Moreover, the extraction of the plasticizers would cause the cord to become inflexible and tend toward becoming rigid. This, of course, cannot be tolerated.

A polymeric plasticizer suitable for purposes of this composition is available commerically from the Monsanto Chemical Company under the designation Santicizer 429.

A preferred concentration added to the PVC and the hereinbefore mentioned plasticizers is 15 to 45 parts by weight to 100 parts by weight of the polymeric material. If less than 15 parts are used, the composition suffers in its resistance to oil extraction. If more than 45 parts are used, the cost of the composition is needlessly increased. Also, if more than 45 parts are used, the amount of the monomer plasticizer must be reduced in order to maintain an acceptable limit for total plasticizer. This causes a reduction in the limiting oxygen index and the resultant extruded composition becomes undesirably soft.

Combined with the PVC and the plasticizers is a metallic stabilizer system which may or may not have a liquid carrier. The aforementioned constituent permits the composition to be extruded by an extrusion apparatus thereby rendering the material processable without any non-uniformity in appearance. Discoloration of course, would not be tolerable with subscribers. The addition of stabilizer also results in a clear composition, the ratio of the metals of the composition being maximized to give a clear color with accompanying heat stability.

A metallic stabilizer suitable for purposes of this composition may include (1) a metallic stabilizer containing a phosphite chelator, (2) a barium stearate, (3) a cadmium-stearate, (4) a barium-ethyl-hexoate, (5) a barium-cadium laurate or (6) a barium cadmium myristate. A metallic stabilizer containing a phosphite chelator may includes a barium-cadmium-zinc phosphite or a barium-cadmium phosphite. The use of these metallic constituents provides early, intermediate and long term heat stability while the chelator optimizes the effectiveness of these constituents.

The metallic stabilizer may be present in solid form or dispersed in a carrier. A preferred carrier may include an organic solvent. This stabilizer may be defined as being an emulsion or suspension of the materials in an organic solvent carrier.

It has been found that a liquid metallic stabilizer has certain advantages. A liquid metallic stabilizer may be added to the compounding mixture together with the other liquid constituents such as the plasticizers and the other stabilizers to benefit the composition at a very early stage of preparation. This dispersion of metals in an organic solution interacts with the polyvinyl chloride and is employed to aid the extrusion process and provide stability.

A preferred concentration added to the PVC and the plasticizers is 1.0 to 5.0 parts by weight of a metallic stabilizer to 100 parts by weight of the polymeric material. If less than 1.0 part is used, the heat stability of the composition is reduced. More than 5 parts detracts from the heat stability of the composition.

One such barium-cadmium zinc phosphite liquid stabilizer which has been found suitable for purposes of the composition embodying the principles of this invention is available commercially from the Ferro Company under the designation Ferro GH-148. The Ferro GH-148 phosphite stabilizer is a liquid emulsion, a metallic stabilizer dissolved in a liquid and includes a 3.9% barium, 1.9% cadmium, and 0.2% zinc by weight of the total emulsion.

A lubricant is combined with the PVC, the plasticizers and the metallic stabilizers. The lubricant used in this composition may, for example, include a metallic stearate or a stearic acid. Functionally, the lubricant (1) adds synergistically to the maintenance of the clarity by helping to avoid yellowing, (2) adds to the heat stability of the composition, and (3) provides lubrication of the composition in the manufacturing process.

The lubrication of the composition insures that all of the constituents blend together to obtain a homogeneous mix with an accompanying reduction of internal friction. The lubricant is also of assistance in causing the composition to be moved onto the extrusion screw, to be melted and to be extruded therefrom in a uniform state in an even flow.

Preferably, a concentration added to the PVC is 0.25 to 1 part by weight of the lubricant to 100 parts by weight of the polymeric material. If less than 0.25 part is used, the flow and hence the extrudability of the composition is reduced. Also, the use of a portion of a part outside the low end of the range causes poor mixings, poor flexing, internal heat buildup in processing, reduced heat stability and high shear forces which leads to burn-up of the material in processing. On the other hand, the use of more than 1 part overlubricates and causes slippage in the extruder.

A stearic acid lubricant available commercially from Emory Industries under the designation Emersol 120 has been found to be a suitable lubricant. Emersol 120 has a melting point of 53°–54° C and is double-press dispersed into a fine powder form to be capable of a more complete dispersion in the overall composition.

In order to provide adequate light stability for the inventive composition, an ultraviolet absorber is combined with the PVC, the plasticizers, the metallic stabilizer, and the lubricant. The addition of the ultraviolet absorber is of assistance in avoiding ultraviolet degradation such as when the telephone cordage having the inventive composition covering the conductors is exposed to sunlight. The polyvinyl chloride is caused to remain intact upon exposure to any ultraviolet radiation.

A preferred concentration added to the PVC is 0.25 to 1.0 part by weight of the ultraviolet absorber per 100 parts by weight of the polymeric material. If less than 0.25 part is used, there is no real protection against ultraviolet exposure. However, if more than 1.0 part is used, the cost of the composition may be prohibitive. Also, an excessive amount of ultraviolet absorber may plate out of the composition.

One family of ultraviolet absorbers which are available and have been found to be acceptable are the substituted benzophenones such as 4-decyl-2-hydroxybenzophenone and known as Mark 202A as marketed by the Argus Chemical Company. The Mark 202A ultraviolet absorber has a melting point of 120° F and is in the form of a powder having an off-white appearance. The choice of absorber must be made carefully in order to prevent loss of clarity in the resulting composition. Ultraviolet absorbers are manufactured to provide light stability for opaque as well as for clear materials. The choice must be made to select one which provides light stability for a clear compound.

Other substituted benzophenones which are acceptable constituents for the claimed composition include a 2-hydroxy-4-dodecyloxy benzophenone, and a 2-hydroxy-4-N-octoxy benzophenone.

Another family of ultraviolet absorbers which may be added to the polyvinyl chloride resin is the substituted acryonitriles. These may include a 2-ethyl-hexyl-2-cyano-3, 3-diphenyl acrylate available commercially from the General Anline Company under the designation UVINUL N539 or an ethyl-2-cyano-3, 3-diphenyl acrylate.

In order to provide additional heat stability for the compound, a low molecular weight epoxy resin is included as a constituent. The epoxy resin has a secondary effect of providing additional light stability for the composition.

A preferred concentration added to the PVC is 1 to 4 parts by weight of epoxy resin per 100 parts by weight of the polymeric material. Should less than 1 part be combined with the PVC, there is a reduction in the heat stability and the extrudability of the composition. Also, the light stability is reduced which may be manifested in early yellowing. If more than 4 parts are used, the long term heat stability is reduced and the cost of the composition is increased.

More particularly, a diglycidyl ester of bisphenol A epoxy (bisphenol A epichlorohydrin epoxy), low molecular weight epoxy resin, having a molecular weight in the range of 350–400 is included as a constituent of the composition. A suitable epoxy resin is marketed by the Shell Chemical Company under the trademark EPON 828, and which is an uncured epoxy (liquid), having an epoxide equivalent of 175–210, an average molecular weight of 350 to 400, and a refractive index at 25° C of 1.570–1.575, and which is a pourable liquid at room temperature. Also suitable are branched di and tri-epoxides manufactured by the condensation of epichlorohydrin and glycerine, an example of which is EPON 812 available from the Shell Chemical Company.

Finally, an epoxy plasticizer may be added to the PVC for additional heat stability and light stability. The heat stability of the composition must be adequate in two regards, one, the short term heat stability and two, long term heat stability. Without the short term heat stability, it may be necessary to discontinue the operation of the manufacturing line since the composition may be degraded in line and possibly in the extruder. Longer term heat stability prevents discoloration of the composition with the passage of time. Should the composition be lacking in long term heat stability, the insulative covering tends to become yellowish and detract from the overall aesthetic appeal of a clear insulation. Adequate heat stability of the composition avoids yellowness of the conductor covering and lengthens the time between shut downs of the manufacturing facility.

It has been found that a preferred concentration added to the PVC is not in excess of 8 parts by weight of the epoxy plasticizer per 100 parts by weight of the PVC.

The epoxy resin and the epoxy plasticizer yield synergistic results as regards the heat stability of the composition, that is, the heat stability of the composition is in excess of that to be expected from the addition of the epoxy plasticizer or the epoxy resin alone. In addition, the epoxy plasticizer acts as a secondary plasticizer for the composition. The employing of more than 8 parts is not compatible with the composition and the plasticizer will exude to the surface. Also, the lacquer-mar resistance is reduced.

An epoxy plasticizer suitable for this composition may include octyl epoxy stearate such as a material available commerically from the Argus Chemical Company and designated Drapex 6.8 or an octyl epoxy tallate have been been found suitable to add the above-mentioned properties into the composition. An octyl epoxy tallate is available under the trade name Drapex 4.4, marketed by the Argus Chemical Company, and has a specific gravity of 9.22 and a molecular weight of 420. An epoxidized soy bean oil or an epoxidized linseed oil have also been found to be acceptable epoxy plasticizers.

Laboratory Brabender heat stability studies supported by actual extrusion trials, demonstrate that this unique combination of additives provides excellent initial clarity as well as long term heat stability.

The hereinbefore described composition has been found to satisfy the requirements of a jacketing material for spring cords. Specifically, the composition (1) is flame retardant, (2) is clear, (3) is extrudable, (4) has excellent low temperature properties, (5) is flexible, (6) includes compatible constituents, i.e., the plasticizers which will not migrate out of the composition, (7) does not produce skin irritations for the customer, (8) has heat and ultraviolet light stability, and (9) possesses excellent retractile properties.

The excellent retractile properties are, of course, necessary in order to use strand material covered with the above-described composition to manufacture spring cords for telephone use. It is important to realize that although constituents may be added for flame retardance, clarity, low temperature properties, etc., the sum effect of all the constituents may not provide the requisite retractile properties. The composition of this invention not only provides for flame retardance, etc. but does, in fact yield excellent retractile properties.

It should be realized that although the composition disclosed and claimed herein was developed essentially as a jacketing material for retractile telephone cords, other uses of the composition may evolve. For example, the claimed composition may very well be used to jacket the line cord which connects the telephone base to the wall terminal.

EXAMPLES

The following examples illustrate various clear flame retardant jacketing compositions prepared in accordance with the invention. In all cases, the structure is that of a conductor such as tinsel conductors with a nylon insulation thereover. Examples are set forth in tabular form. For comparison purposes, all examples set forth were carried out using the homopolymer described hereinbefore. Moreover, all amounts are in parts by weight.

TABLE I

| Ranges | | Examples | | | | | | | |
|---|---|---|---|---|---|---|---|---|---|
| | | A | B | C | D | E | F | G | H |
| 100 | PVC Resin | 100 | 100 | 100 | 100 | 100 | 100 | 100 | 100 |
| 10–40 | Phthalate Plasticizer | 10 | 25 | 14 | 40 | 18 | 10 | 22 | 21 |
| 15–40 | Phosphate Plasticizer | 35 | 20 | 15 | 15 | 20 | 40 | 20 | 20 |
| 15–45 | Polymeric Plasticizer | 25 | 20 | 45 | 15 | 20 | 15 | 23 | 23 |
| 1.0–5.0 | Ba, Cd, Zn, Phosphite Stabilizer | 5 | 3 | 3 | 3 | 1 | 3 | 2.5 | 2.5 |
| 0.25–1.0 | Lubricant | 0.25 | 0.25 | 0.5 | 0.5 | 1.0 | 0.25 | 0.5 | 0.5 |
| 0.25–1.0 | UV-Absorber | 0.25 | 1.0 | 0.5 | 0.5 | 0.5 | 0.25 | 0.5 | 0.5 |
| 1.0–4.0 | Epoxy Resin | 4 | 3 | 3 | 3 | 1 | 4 | 3.0 | 3.0 |
| 0–8.0 | Epoxy Plasticizer | 0 | 2 | 1 | 0 | 8 | 0 | 0 | 0 |

All of the example compositions of Table I result in acceptable jacketing for retractile cords. Each of the example compositions of Table I meets the physical and chemical requirements set out hereinafter. Of those compositions shown in Table I, example G is preferred for manufacturing retractile cords. The composition of example H is preferred for manufacturing line cords.

The phthalate plasticizer used in example G in Table I, is DUP (referred to hereinbefore), a high molecular weight phthalate ester based on essentially linear undecanol (C 11 alcohol). Example H uses a phthalate plasticizer marketed by Monsanto Chemical Company under the designation Santicizer 711. This is a high molecular weight branched ester based as a blend of C7, C9 and C11 alcohols.

Subcombination Requirements

Referring now to Table I, it is important to recognize that certain subcombinations of the constituents of the inventive composition are necessary in order to achieve certain desirable results. For example, it is important that the combined parts by weight of the plasticizers — the phthalate plasticizers, the phosphate, the polymeric plasticizer and the epoxy plasticizer if any is used — be at least equal to 50 parts by weight per 100 parts by weight of the PVC resin to provide adequate properties at low temperatures. Moreover, if the composition is not provided with sufficient quantities of plasticizer, the composition will not possess adequate shear heat resistance.

There is also an upper limit for the total parts by weight of the plasticizers per 100 parts by weight of the polymeric material. If the plasticizers total over 75 parts by weight, the resulting jacket becomes very flexible and also becomes very difficult to strip from the primary insulation, i.e., the insulation on the individual conductors.

The main function of the phthalate plasticizer is to achieve the low temperature qualities of the composition while the epoxy plasticizer is included for clarity, heat stability and secondarily for imparting low temperature properties to the composition. The phosphate plasticizer provides good low temperature properties down to approximately 0° C; the polymeric plasticizer, down to approximately −10° C.

While the phthalate plasticizer and the epoxy plasticizer perform equally as well with regard to the low temperature characteristics of the composition, the epoxy plasticizer is more expensive than the phthalate. Moreover, increased parts by weight of the epoxy plasticizer engenders lacquer-mar problems.

Although the combinations of the phthalate phosphate, polymeric and the epoxy plasticizers, should have combined parts by weight at least equal to 50, per 100 parts by weight of the polymeric material, it is important to recognize that the phosphate must be maintained at not more than 40 parts by weight per 100 parts by weight of the polymeric material. Should the other constituents not be added to this subcombination, the heat stability and low temperature properties of the composition may become unacceptable. On the other hand, if the phosphate constituent in and of itself were used to satisfy the subcombination parts by weight of 50 per 100 parts by weight of the polymeric material, the composition would fail the heat stability test as well as the oil extraction requirement. Moreover, the phosphate constituent, which is primarily used for flame retardancy, is inferior to the phthalate plasticizer with respect to enhancing the low temperature qualities of the composition.

When using the diundecyl phthalate (DUP), it is important to maintain a weight ratio of the DUP to the phosphate plasticizer which is less than two to one (2:1). This is necessary since the phosphate acts as a solvent for the very powerful DUp and insures that the DUP is soluble in the composition. In this way, the excellent low temperature properties of the DUP can be realized while insuring compatibility of the DUP with the other constituents.

In arriving at a composition which is processable and which meets the minimum requirements as will be set forth hereinafter with regard to certain ASTM and other tests, a certain degree of heat stability must be maintained. The barium-cadmium-zinc phosphite stabilizer is primarily responsible for heat stability with a secondary function of the epoxy resin and the epoxy plasticizer also being of assistance in imparting heat stability to the composition. Of course, the composition must be structured so that the constituents which give the composition heat stability are compatible with providing the composition with a desired amount of lacquer-mar resistance.

The barium-cadmium-zinc phosphite stabilizer may be varied to effect clarity and heat stability. It is important to recognize that not only is the long term clarity important, but also initial clarity as the material is moved out of the extruder die. A balance between the barium-cadmium-zinc phosphate stabilizer and the epoxy resin is sought to impart heat stability plus the initial clarity to the composition.

TESTING

The clear flame retardant composition for producing retractile cords must possess specified properties, some of which have been described hereinbefore. The following table, Table II, indicates the properties of a preferred composition, having the composition designated Example G in Table I: for spring cords, the properties for the composition H used to produce line cords as well as the properties for Examples B and E.

TABLE II

TEST RESULTS FOR EXAMPLES

| Properties | B | E | Examples G | H | Limiting Value | ASTM Testing Spec. No. |
|---|---|---|---|---|---|---|
| Tensile Strength (psi) | | | 2400 | 2340 | | D 412 |
| Tensile Stress at 100% Elongation (psi) | | | 1070 | 1000 | | D 412 |
| Ult. Elongation Unaged (%) | | | 415 | 420 | | D 573 |
| Ult. Elongation after 2 days Aging (% of Orig.) | | | 98 | 100 | | D 573 |
| Heat Dist. (%) | | | 21 | 30 | | D 2219 |
| Tear Resist. (lb./in.) | | | 400 | 360 | | D 624 |
| Volatile Loss (%) | | | 1.7 | 2.1 | | D 1203 |
| Spec. Gravity | | | 1.25 | 1.26 | | D 792 |
| Low Temp. Brittleness (No. of Failures at −10°C) | 0 | 0 | 0 | 0 | 2(Max.) | D 746 |
| Low Temp. Brittleness | | | | | | |

TABLE II-continued

TEST RESULTS FOR EXAMPLES

| Properties | B | E | Examples G | H | Limiting Value | ASTM Testing Spec. No. |
|---|---|---|---|---|---|---|
| Point | | | −25°C | −20°C | | |
| Finish Mar (% Softening after 20 Hrs. contact at 23°C) | 45 | 54 | 46 | 46 | 85(Max.) | |
| Torsional Resilience (Max. recovery time in Seconds) | 3 | 4 | 4 | 3 | 8(Max.) | |
| Mod. in Flexure (psi) | | | 960 | 1040 | | D 747 |
| Mod. in Flexure after 24 Hr. Oil Immersion % of Original | 120 | 130 | 118 | 109 | 250(Max.) | D 747 |
| Mod. of Rigidity at −10°C (psi) | | | 10,000 | 9090 | | D 1043 |
| −20°C | | | 36,000 | 35970 | | D 1043 |
| L.O.I. (%) | 25 | 25 | 26.3 | 25.6 | 23(Min.) | D 2863 |
| Sulfide Staining | | | None | None | | D 1712 |
| Shear Strength (psi) | | | 990 | 980 | | |
| Heat Stability Brabender Test (time in min.) | 35 | 28 | 30 | 31 | 15 (Min.) | |

The tensile stress at 100% elongation is a measure of how well an extruded jacket of the inventive composition will elongate under specified conditions of test.

The heat distortion is a measure of how much the cord jacket will distort under heat in terms of percent distortion from the original configuration. This test is an indication of the ability of the cord to withstand heat should a subscriber inadvertently cause the cord to become engaged with a high temperature surface.

The tear resistance of the composition is an indication of the toughness of a cord having an extruded jacket of the inventive composition as resisting tear, say, when the cord is extended over edges of furniture or other supporting surfaces.

During the extrusion of a covering material of the inventive composition over the tinsel conductors, it is important to be able to maintain a certain volatile loss within specified limits to prevent excessive amounts of the material from going into a gaseous state. The volatile loss is expressed as a percent of initial quantity of material.

The phthalate plasticizer imparts to the composition the capability of maintaining desirable properties at lower than −10° C. No more than two samples out of 10 should develop a clean break or cracks at −10° C when tested in accordance with A.S.T.M. specification D 746.

During use, a subscriber's hand, in engagement with the cord, tends to cause the jacketing composition to exude plasticizers therefrom. When this happens, the flexure strength of the jacketing material is reduced causing the cord to become stiff and possibly break if exposed thereafter to low temperatures.

In order to measure the resistance of the composition to extraction of plasticizers by oils, the relative stiffness of a section of the material in a dry state is determined. Then the section is immersed in oil of predetermined characteristics and the relative stiffness again measured. The modulus of flexure changes as a function of the amount of oil extraction. Hence the measure of oil extraction is determined by measuring the change in the modulus of flexure. The test procedure is outlined in A.S.T.M. specification D 747. Hence, the modulus in flexure after a predetermined immersion in oil is indicative of the ability of the composition to maintain flexure strength when handled by the subscriber. For example, the maximum increase in modulus of flexure after oil immersion for 24 hours should be no greater than 250%.

Tests have also been conducted to insure that cords jacketed with the inventive composition does not adversely affect a subscriber from a dermatological standpoint. Patch tests on the skin of several hundred volunteers are made and the severity of skin reaction recorded, using a scale of 0 to 4 with 4 being the most severe. The inventive compositions have a recorded severity of 0 for all persons tested by professional testing laboratories.

Test procedures have been devised to determine the lacquer-mar resistance of a composition in terms of the resistance of the composition to exuding constituents onto surfaces in engagement with a cord manufactured in accordance with the inventive composition. A sheet of material from which furniture may be constructed is painted with a nitrocellulous base lacquer and the Rockwell hardness of the surface determined. Then a sheet of the inventive composition is pressed into engagement with the lacquered surface for a predetermined time after which the cord is removed and the hardness of the contacted portions of the surface retested for hardness. The quotient of the difference in the original hardness and the final hardness divided by the original hardness multiplied by 100 yields a percent softening of the lacquered surface and is referred to as % Finish-Mar. This is an indication of the amount of plasticizer exuding from the composition and causing softening of a lacquered surface. For the examples in Table I, the finish-mar resistance should not exceed 85% after 20 hours contact at 23° C.

It is also important that the material having the above-described composition be processable without degradation within an extrusion apparatus. In order to measure the ability of the material to withstand the extrusion process, a Laboratory Brabender test is used. The test is designed to be analogous to the extrusion process. In that test, a measured sample of the composition is introduced to a chamber to be subjected to forces by two rotating sigma blades which tend to churn and fuse and hence degrade the material. The time elapsed to the beginning of degradation of the composition is measured. A measured time in excess of 15 minutes will insure that the material of the inventive composition will not yellow or discolor otherwise during the extrusion process.

Each of the example compositions was found to have acceptable heat stability. This is indicated by the composition's being capable of being subjected to at least a 15 minute run in a Brabender test without being degraded.

Of great importance in evaluating a composition for use in covering telephone spring cords is the resilient property of the extruded composition. This is determined by deforming an extruded shape of the composition and then measuring the time required for the shape to regain its original configuration. The measured time is compared to an acceptable standard time in seconds (see Table II) and is indicative of the torsional resistance of the cord. The maximum recovery time for a cord insulated with an acceptable composition should not exceed 8 seconds.

Of the properties enumerated in Table II, the low temperature brittleness, the finish-mar resistance, the L.O.I., the heat stability and the resilience are among the most important.

METHOD OF COVERING STRAND MATERIAL

In a method of covering strand material such as the tinned tinsel nylon covered conductors with a composition embodying the principles of this invention, the PVC resin is heated to a temperature of approximately 170° C. Then a liquid system is prepared by mixing thoroughly the plasticizers and the stabilizers together with the epoxy resin to obtain a homogeneous mix. The liquid system is then added to the resin system with the application of heat being continued until the temperature is raised to approximately 190° C. Then the powder constituents, the lubricant and the ultraviolet absorber are added and the mixture run for approximately five minutes in a Henchel mixer to heat and fuse together the constituents.

The mixture is then released in the form of a powder to a holding tank. Subsequently, the powder material is moved into an extruder-pelletizer where the material is fused and then cubed into pellets. The pelletized composition is then fed into an extruder typically having three heating zones, a first zone being at 320° F and the last zone at 350° F. A typical commercially available extruder may be that shown and described in U.S. Pat. No. 3,579,608, issued May 18, 1971. In this way, the material is in the form of an extremely viscous fluid at the extruder head to permit pressure extrusion thereof about the advancing successive sections of the strand material.

Alternately, all of the constituents may be mixed together in say a Banbury mixer. There are several advantages to this approach in which a fused mixture of the ingredients is produced and then formed into a sheet which is diced into pellets. The overall temperature of this system is less because of rotating blades designed for very intensive mixing. This reduces the possibility of heat degradation of the material. Also, by adding all of the constituents simultaneously, the stabilizers are present to prevent initial heat degradation.

The composition admitted to the extruder is worked thoroughly and moved toward a die end of the extruder. There is some latitude in the selection of extruder screw sizes and speeds as well as operating temperatures in order to successfully extrude the inventive composition about successive sections of the core of tinned tinsel conductors.

The nylon-covered tinsel conductor core for example, is treated with silicone-water spray mixture in order to facilitate stripping of the PVC jacket from the nylon-covered cord during use of the cord. However, if excessive amounts of the silicone-water spray mix is used, the cord will be too well lubricated and the jacket not properly adhered to the nylon cord. Since the successive sections of the PVC-jacketed cord are being advanced by a capstan exterting pulling forces through the external surface of the jacketed cord, a jacket not properly bonded to the core must withstand in and of itself all the pulling forces. This causes what is commonly referred to as stress-crazing, the forming of very small cracks in the jacket, which is detrimental to the integrity and appearance of the jacket material.

It is also important during the processing of the material of the inventive composition using nylon insulated conductors to maintain the conductors in a predetermined path of travel to avoid curvature of the conductors during the extrusion process. Any curved portions of the conductors will result in a portion of the cord having a different refractive index which is readily observable in a clear cord.

The composition described herein is extrudable. However, the composition could be callendered into sheets which could be divided into a form suitable for feeding to an extruder. In the alternative, a plurality of spaced conductive cores or conductors could be enclosed between two of the sheets with the sheets subsequently cut into strips to produce jacketed cords.

Subsequently, the jacketed cord is cut to predetermined lengths. Each length is then wound on a mandrel to form a plurality of closely spaced helical convolutions. Then the mandel and cord wound thereon are exposed to heat after which the cord is removed from the mandrel and rewound so as to reverse the pitch of the convolutions. The ends of the cord are finished and packaged for delivery to a subscriber.

It is to be understood that the above-described arrangements are simply illustrative of the principles of the invention. Other arrangements may be devised by those skilled in the art which will embody the principles of the invention and fall within the spirit and scope thereof.

What is claimed is:

1. An elongated material provided with covering of a clear flame retardant composition which includes a polymeric material consisting essentially of at least 80 percent, by weight of polyvinyl chloride; 10 to 40 parts by weight of a low molecular weight monomeric plasticizer selected from the group consisting of di (N-hexyl-n-decyl) and di-undecyl phthalate plasticizers per 100 parts by weight of the polymeric material; 15 to 40 parts by weight of a phosphate plasticizer selected from the group consisting of triaryl phosphate and isodecyl diphenyl phosphate, per 100 parts by weight of the polymeric material; 15 to 45 parts by weight of a medium-high molecular weight polymeric polyester plasticizer made from a glycol reacted with a dibasic acid, per 100 parts by weight of the polymeric material; 1 to 5 parts by weight of a metallic stabilizer, per 100 parts by weight of the polymeric material; 0.25 to 1.0 part by weight of a lubricant, per 100 parts by weight of the polymeric material; 0.25 to 1.0 part, by weight of an ultraviolet light absorber per 100 parts by weight of the polymeric material; and 1 to 4 parts, by weight of an epoxy resin, per 100 parts by weight of the polymeric material wherein the combined parts by weight of the plasticizers is at least 50 parts by weight per 100 parts by weight of the polymeric material.

2. The strand material of claim 1, wherein the composition also include no greater than 8 parts by weight of an epoxy plasticizer, per 100 parts by weight of the polymeric material.

3. The strand material of claim 1, wherein the weight ratio of the diundecyl phthalate plasticizer to the phosphate plasticizer is less than two to one.

4. The strand material of claim 1, wherein the metallic stabilizer is selected from the group consisting of a metallic stabilizer which includes a phosphite chelator, a barium stearate, a cadmium stearate, a barium-ethyl-hexoate, a barium-cadmium-laurate and a barium-cadmium myristate.

5. The strand material of claim 4, wherein the metallic stabilizer including a phosphite chelator includes a barium-cadmium-zinc stabilizer with a phosphite chelator and a barium-cadium stabilizer with a phosphite chelator.

6. The strand material of claim 1, wherein the lubricant is selected from the group consisting of a metallic stearate and a stearic acid.

7. The strand material of claim 1, wherein the ultraviolet light absorber is an ultraviolet absorber selected from the group consisting of a substituted benzophenone and a substituted acryonitrile.

8. The strand material of claim 7, wherein the substituted benzophenone is selected from the group consisting of a 4-decyl-2-hydroxy benzophenone, a 2-hydroxy-4-dodecyloxy benzophenone and a 2-hydroxy-4-N-octoxyl benzophenone.

9. The strand material of claim 7, wherein the substituted acryonitrile is a substituted acryonitrile selected from the group consisting of a 2-ethyl-hexyl-2-cyano-3, 3-diphenyl acrylate and an ethyl-2-cyano-3, 3-diphenyl acrylate.

10. The strand material of claim 1, wherein the epoxy resin is selected from the group consisting of a diglycidyl ester of bisphenol A epoxy (bisphenol A epichlorohydrin epoxy) and branched di and tri epoxides manufactured by the condensation of epichlorohydrin and glycerine.

11. The strand material of claim 1, wherein the polymeric material is a polyvinyl chloride homopolymer.

12. The strand material of claim 2, wherein the epoxy plasticizer is an epoxy plasticizer selected from the group consisting of an octyl epoxy stearate, an octyl epoxy tallate, an epoxidized soybean oil and an epoxidized linseed oil.

13. The strand material of claim 2, wherein the combined parts, by weight of the monomeric, phosphate, polymeric and the epoxy plasticizers, per 100 parts by weight of the polymeric material, is at least equal to 50.

14. The strand material of claim 2, wherein the combined parts by weight of the plasticizers, per 100 parts by weight of the polymeric material, does not exceed 75.

15. The strand material of claim 1, wherein the parts, by weight of the phosphate plasticizer, per 100 parts by weight of the polymeric material, is not greater than 40.

16. A method of making a strand material covered with a clear flame-retardant composition, which includes the steps of:

advancing successive sections of the strand material; and extruding a coating about the strand material, the composition of the coating including a polymeric material consisting essentially of at least 80 percent by weight, of polyvinyl chloride; 10 to 40 parts, by weight of a low molecular weight monomeric plasticizer selected from the group consisting of di(N-hexyl-n-decyl) and di-undecyl phthalate plasticizers, per 100 parts by weight of the polymeric material; 15 to 40 parts by weight of a phosphate plasticizer selected from the group consisting of triaryl phosphate and isodecyl diphenyl phosphate, per 100 parts by weight of the polymeric material; 15 to 45 parts by weight of a medium-high molecular weight polymeric polyester plasticizer per 100 parts by weight of the polymeric material 1 to 5 parts by weight of a metallic stabilizer, per 100 parts by weight of the polymeric material; 0.25 to 1.0 part by weight of a lubricant, per 100 parts by weight of the polymeric material; 0.25 to 1.0 part by weight of an ultraviolet absorber, per 100 parts by weight of the polymeric material; and 1 to 4 parts, by weight of an epoxy resin, per 100 parts by weight of the polymeric material wherein the combined parts by weight of the plasticizers is at least 50 parts by weight per 100 parts by weight of the polymeric material.

* * * * *

UNITED STATES PATENT OFFICE
CERTIFICATE OF CORRECTION

Patent No. 3,941,908  Dated March 2, 1976

Inventor(s) Maheshkumar Parmananddas Valia et al.

It is certified that error appears in the above-identified patent and that said Letters Patent are hereby corrected as shown below:

In the specification, Column 2, line 63, "monomenic" should read --monomeric--. Column 3, line 33, following "inventive", insert --composition--; line 68, "GR" should read --GP--. Column 6, line 65, "cadium" should read --cadmium--. Column 8, line 12, "be" should read --become--; line 60, "EPON" should read --EPON®--; line 67, "EPON" should read --EPON®--. Column 9, line 27, "employing" should read --employment--; line 35, delete the word "been" in the second occurrence. Column 16, line 11, "exterting" should read --exerting--; line 48, following the word "elongated", insert --strand--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*